United States Patent
Steinhafel

(10) Patent No.: US 12,460,839 B1
(45) Date of Patent: Nov. 4, 2025

(54) STEP MODULATING SWING TANK FOR HEAT PUMP WATER HEATER

(71) Applicant: Bock Water Heaters, Inc., Madison, WI (US)

(72) Inventor: Michael B. Steinhafel, Madison, WI (US)

(73) Assignee: Bock Water Heaters, Inc., Madison, WI (US)

( * ) Notice: Subject to any disclaimer, the term of this patent is extended or adjusted under 35 U.S.C. 154(b) by 0 days.

(21) Appl. No.: 18/932,953

(22) Filed: Oct. 31, 2024

(51) Int. Cl.
| | |
|---|---|
| F24H 15/37 | (2022.01) |
| F24D 17/00 | (2022.01) |
| F24H 1/20 | (2022.01) |
| F24H 4/04 | (2006.01) |
| F24H 15/258 | (2022.01) |

(52) U.S. Cl.
CPC .......... F24H 15/37 (2022.01); F24D 17/0078 (2013.01); F24H 1/201 (2013.01); F24H 4/04 (2013.01); F24H 15/258 (2022.01)

(58) Field of Classification Search
CPC ........ F24H 15/37; F24H 15/258; F24H 1/201; F24H 4/04; F24D 17/0078
See application file for complete search history.

(56) References Cited

U.S. PATENT DOCUMENTS

| | | | |
|---|---|---|---|
| 4,598,764 A | 7/1986 | Beckey | |
| 5,984,198 A | 11/1999 | Bennett et al. | |
| 9,644,850 B2 | 5/2017 | Cho | |
| 2010/0280665 A1* | 11/2010 | Fildes | F24H 9/2035 700/275 |
| 2016/0138830 A1* | 5/2016 | Lesage | F24H 15/37 219/486 |

OTHER PUBLICATIONS

"Central Heat Pump Water Heater Design Guide," Energy Trust of Oregon. Swing tank on pp. 4-5. chrome-extension://efaidnbmnnnibpcajpcglclefindmkaj/https://www.energytrust.org/wp-content/uploads/2023/04/New-Buildings_Design-Guide-for-Central-Heat-Pump-Water-Heaters.pdf, Downloaded Jun. 4, 2024.
"Electric Tankless Water Heater," A O Smith, Sep. 2021. Four-element models, p. 10.
"E360 Air Source Heat Pump Water Heater Installation Manual," Nyle Water Heating Systems, chrome-extension://efaidnbmnnnibpcajpcglclefindmkaj/https://files.heatwater.com/heatwater/uploads/2024/02/03143524/61000271-RevB-IM-e360-090124.pdf downloaded Oct. 30, 2024.

* cited by examiner

Primary Examiner — Edward F Landrum
Assistant Examiner — Thomas J Ward
(74) Attorney, Agent, or Firm — Willard Quinn PLLC

(57) ABSTRACT

A water heating system has an exterior heat pump water heater supplying heated water to a storage tank connected to a recirculation loop with a swing tank. A controller receives measured ambient air temperature from an outdoor temperature sensor mounted exterior to the building near the heat pump water heater. The swing tank has three banks of resistance heating elements arranged into first, second and third heating sectors controlled by the controller. When ambient temperatures are more than about 8 degrees Fahrenheit above freezing, only the first heating sector heating elements are activated when heating is called for. When ambient temperature is less than this level and greater than about 8 degrees Fahrenheit below freezing, the heating elements in the first and second heating sectors are activated. When the ambient temperature is less than this, all heating sectors are activated, thus providing advantageous levels of hot water heating efficiency.

3 Claims, 3 Drawing Sheets

STEP MODULATING SWING TANK FOR HEAT PUMP WATER HEATER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to heat pump water heater systems in general, and more particularly to systems employing swing tanks.

With the concern for reducing emissions of carbon dioxide, certain state and local governments are instituting regulations that limit or eliminate natural gas installations in new construction. To address this changed construction paradigm, builders of multi-unit residential projects may shift from providing smaller gas-fired water heaters which can rapidly heat and replenish a hot water supply on demand, to the use of water heaters employing electric heat pump technology. In some localities, heat pump water heaters are required in certain circumstances, for example, California's Title 24 building efficiency standards and Washington state's Energy Code-Commercial, adopted in 2024.

Although heat pump water heaters can provide very efficient use of electricity, they demonstrate slower recovery, and can require larger storage tanks. Moreover, the efficiency of a heat pump is strongly affected by ambient temperatures.

There are two common types of commercial heat pump water heater systems. In a single-pass system, the heat pump heats the incoming water to the desired temperature in a single pass through the heat pump. However, because the heat pump is most efficient when starting with lower-temperature water, in these systems the water in the recirculation loop (which keeps the water warm on demand at the tap) is maintained at the desired temperature by another heat source within a separate water storage device called a swing tank. In a multi-pass system the hot water passes through the heat pump water heater multiple times, each pass lifting the temperature 10 to 20 degrees Fahrenheit. The recirculation loop water is maintained by a multi-pass heat pump or swing tank. The single-pass system requires less storage, because the recovery time is shorter with the same capacity of heat pump water heater. The single-pass system also may advantageously employ $CO_2$ as the refrigerant, which has the lowest global warming potential of those currently available.

All heat pump systems experience lower heating capacity and efficiency when operated in low temperature conditions. It is known to deactivate heat pumps when temperatures fall and substitute electric heating elements, but this approach does not capture all available efficiencies. What is needed is a hot water heating system which can rely on the efficiencies of a heat pump when ambient conditions are favorable, but which can efficiently provide electric resistance heating when appropriate.

SUMMARY OF THE INVENTION

The swing tank is connected to the water recirculation loop of the building, and maintains the recirculation loop water temperature independent of the heat pump water heater. The swing tank receives water from the heat pump water heater via the primary storage tanks (series swing configuration) or is piped in parallel with the primary storage tanks (parallel swing configuration) and has a controller connected to an exterior outdoor temperature sensor mounted in the vicinity of the heat pump water heater to receive measured ambient air temperature levels. Three banks of three electric resistance heating elements each are positioned within the swing tank, arranged in a first heating sector, a second heating sector and a third heating sector. The controller activates the heating elements in the different sectors based on the temperature information received from the outdoor temperature sensor. The controller uses understood relationships between heat pump performance and ambient air temperature in its activation of supplemental heating elements. Since heat pumps have their best efficiency at higher temperatures, when the measured exterior temperature is greater than about 40 degrees Fahrenheit, on a call for heat in the swing tank only the heating elements in the first heating sector are activated. When exterior temperatures fall below about 40 degrees Fahrenheit but are still above about 24 degrees Fahrenheit, only the elements in the first and second sectors are activated. When the measured exterior temperature is less than about 24 degrees Fahrenheit, all the resistance heaters are activated. In addition to providing more optimal levels of energy efficiency, the swing tank can operate as a backup water heater for the building if the heat pump water heater must be taken off-line for repair or maintenance.

The present invention provides a swing tank for use with a heat pump water heater which adjusts the level of provided resistance heating based on measured exterior ambient temperatures and the stored water temperature inside the swing tank.

An object of the present invention is to provide a water heating system which adjusts the level of supplemental heat provided in a heat pump water heater system under changing ambient air conditions in pursuit of greater water heating efficiency.

It is another object of the present invention to provide a swing tank for a water heating system with automatically adjustable levels of resistance heating depending on detected ambient exterior air temperatures and stored water temperature inside the swing tank.

It is a further object of the present invention to provide a swing tank in a water heating system incorporating a heat pump which can continue to supply hot water when the heat pump is out of service.

Further objects, features and advantages of the invention will be apparent from the following detailed description when taken in conjunction with the accompanying drawings.

DESCRIPTION OF THE PREFERRED EMBODIMENTS

Figure 1:
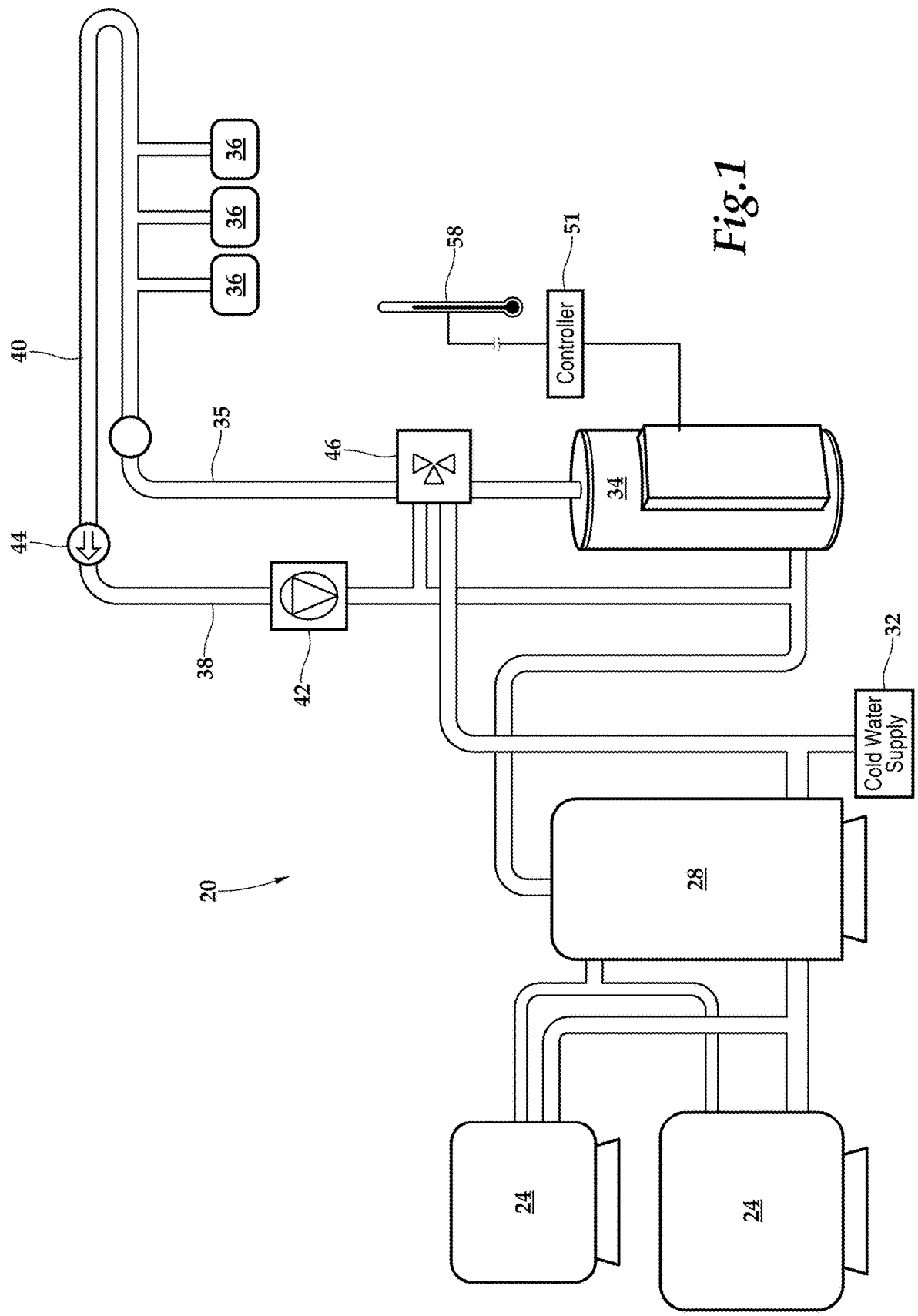
FIG. 1 is a schematic drawing of a water heater of this invention piped in a series swing configuration within a hot water system employing a heat pump.

A water heating system 20 is shown in FIGS. 1-5, wherein like numbers refer to similar parts. The hot water system 20 may be used, for example, in a multi-family residential building 22 having multiple units each with a lavatory, tub, kitchen sink or other fixture 36 requiring heated water. As shown in FIG. 1, the system 20 has one or more heat pump water heaters 24 located exterior of the building 22.

The heat pump 24 works by circulating a liquid refrigerant, such as $CO_2$, through a tube located in warmer ambient exterior air, where the refrigerant evaporates and the heated gas is then compressed and directed through a heat exchanger where the heat is transferred to the water. The heat pumps 24 work most effectively starting with cold water, hence they are supplied with cold water from a cold water supply 32 such as a city water main, or cooler water pumped back to the heat pump from the primary storage tank 28. Once the water is heated it is transferred to a primary hot water storage tank 28 which may be on the interior 30 or exterior of the building 22.

The hot water in the storage tank 28 passes to a swing tank 34. The swing tank 34 is positioned on the building interior 30 and is mounted to supply hot water by a hot water line 35 to the fixtures 36 of the building 22, such as the faucets in lavatories, sinks and tubs. A hot water return line 40 returns from the fixtures 36 to the swing tank 34. If not called for at the fixtures 36, the water in the hot water line 35 is returned through the return line 40 by a circulation pump 42. The hot water line 35 and the hot water return line 40 are part of a recirculation loop 38 through which the hot water is continuously circulated, even when the fixtures 36 are not drawing hot water. Especially in buildings with long pipe runs, the recirculation loop 38 allows the supply of hot water to the users at the tap without undue delay. A check valve 44 is positioned in the recirculation loop 38 to prevent reverse flow. A thermostatic mixing valve 46 is positioned in the hot water supply line which is connected to the cold water supply 32. The mixing valve 46 mixes the hot water from the swing tank 34, and the primary storage tank 28, with the cold water to obtain hot water at a desired set temperature.

Heat pumps 24 can be very efficient when the ambient temperatures are warm, but as shown in Table I, at lower temperatures the efficiency, and hence the hot water production capacity, of a heat pump water heater invariably declines. Table I is an example of the performance of a conventional heat pump water heater, the e360 Air Source Heat Pump Water Heater, manufactured by Nyle Water Heating Systems, Inc. of Bangor Maine.

TABLE I

| Heat Pump Attributes for 140° F. leaving water temperature, water inlet temperature of 40° F. | | | | | | | | | | |
|---|---|---|---|---|---|---|---|---|---|---|
| Ambient DB Temperature ° F. | 10 | 24 | 30 | 40 | 50 | 60 | 70 | 80 | 90 | 100 |
| Heating capacity (kbtu/h) | 98 | 126 | 141 | 171 | 205 | 241 | 287 | 333 | 351 | 351 |
| Unit heating coefficient of performance (COP) | 2.4 | 2.4 | 2.5 | 2.8 | 3.0 | 3.2 | 3.4 | 3.6 | 3.8 | 3.9 |

The swing tank 34 addresses these inherent characteristics of heat pumps by providing an arrangement of resistance heating elements 48 which are brought into operation step-wise at predetermined ambient temperatures to address the known performance of the attached heat pumps.

As shown in FIGS. 2 to 5, the swing tank 34 has an electric heating apparatus 50 which has three banks 52, 54, 56 of three resistance heating elements 48 each. The banks of heating elements are operated under the control of an electronic controller 51 which is capable of activating one, two, or all three banks in a controlled response to the outdoor ambient temperature detected by an outdoor temperature sensor 58 which is mounted exterior to the building in the vicinity of the heat pump water heater 24. The outdoor temperature sensor may be a thermistor, which is a device the resistance of which depends on temperature. The controller 51 is connected to the outdoor temperature sensor to detect a measured temperature. A set point is selected which is the temperature at which the hot water is desired to exit the swing tank.

As shown by the numbers in Table I, the coefficient of performance (COP) of the heat pump declines significantly with declining ambient temperature. Recognizing this, the controller 51 is configured to have two temperature limits, which define ranges of operating one, two or all three banks of heating elements. The temperatures should be selected at points when the COP is significantly reduced, for example, the first temperature limit may be selected at a level where the COP of the heat pump at an ambient temperature of the first temperature limit is less than about ⅞ of the coefficient of performance of the heat pump at an ambient temperature of 70 degrees Fahrenheit, for example about 40 degrees Fahrenheit. The second temperature limit may be selected such that the coefficient of performance of the heat pump at an ambient temperature of the second temperature limit is less than about ¾ of the coefficient of performance of the heat pump at an ambient temperature of 70 degrees Fahrenheit, for example at about 24 degrees Fahrenheit.

Figure 3:
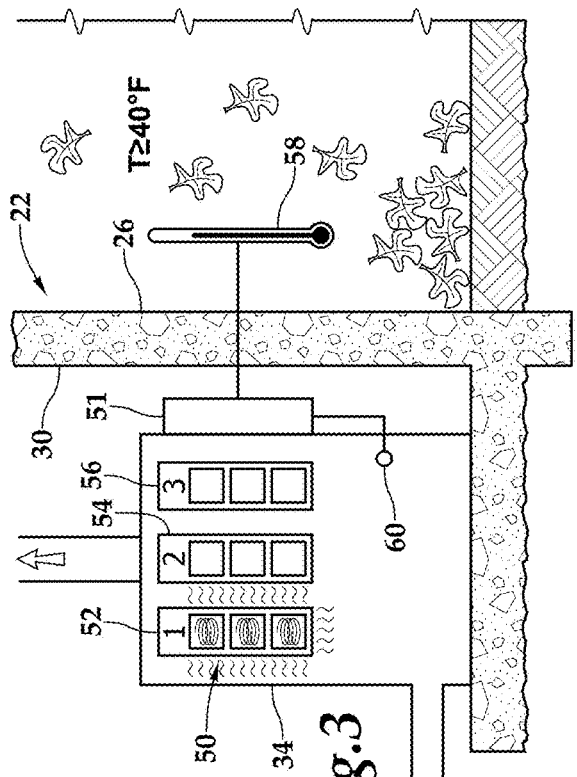
FIG. 3 is a schematic drawing of the water heater of FIG. 1 when ambient temperatures fall, but heating needs are still provided by a single bank of heating elements.
Figure 2:
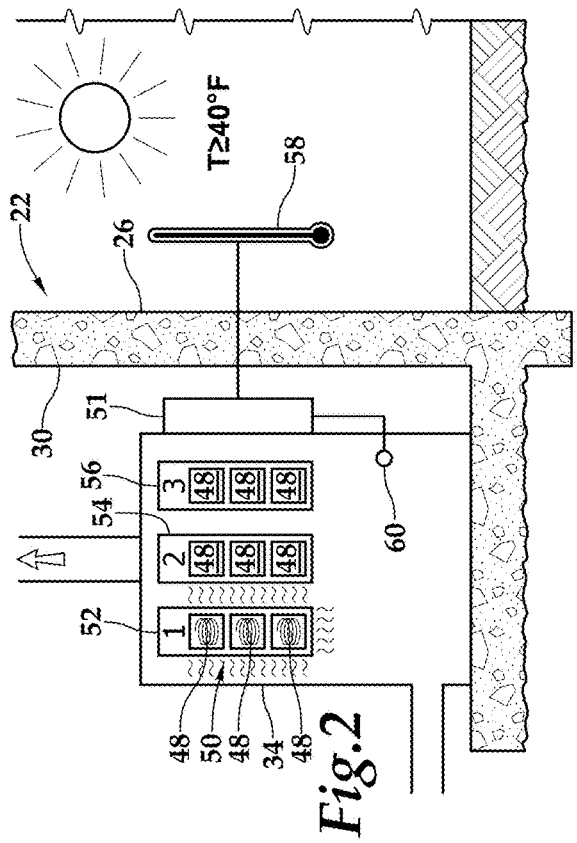
FIG. 2 is a schematic drawing of the water heater of FIG. 1 when ambient temperatures are high enough that the heat pump supplies all the primary water heating need and the swing tank provides the recirculation loop heating need.

When the ambient temperatures are warm, above about 40 degrees Fahrenheit, the heat pump water heater operates efficiently and at most times supplies adequate levels of hot water to the primary storage tank 28 and in the case of the system of FIG. 1, to the swing tank. As shown in FIG. 2, at these temperatures in some cases the heating apparatus 50 may not be required to supply heat to the incoming hot water from the hot water storage tank 28. An internal thermometer 60 is positioned to measure the temperature of the water within the swing tank 34 through a thermowell (not shown). As shown in FIG. 3, if the temperature of the water within the swing tank 34 falls below a desired set temperature, for example due to recirculation demand, the controller calls for heat and activates only the first bank 52 of heating elements to run until the desired set temperature is restored.

Figure 4:
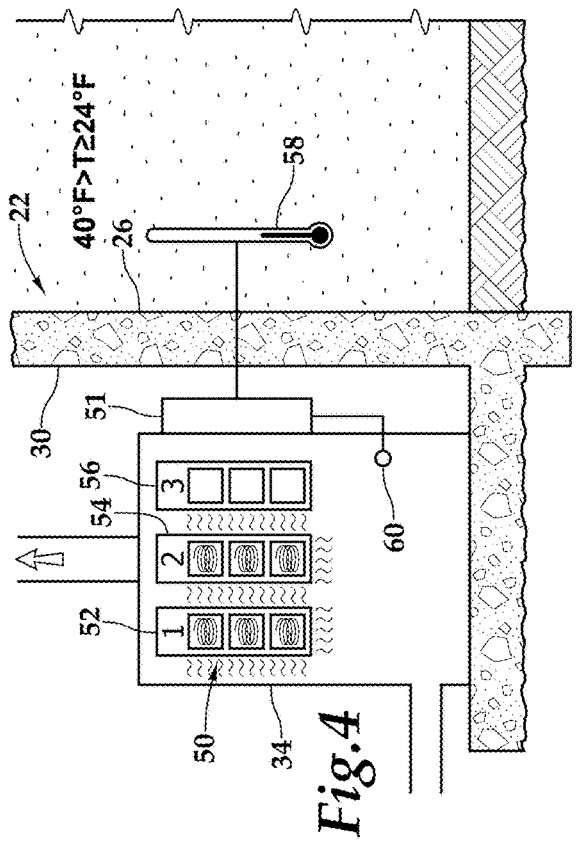
FIG. 4 is a schematic drawing of the water heater of FIG. 1 when ambient temperatures are cooler.

It is known that when the outdoor temperature falls below about 40 degrees Fahrenheit (about 8 degrees above freezing), the efficiency and capacity of the heat pump water heater declines such that it is desirable to supplement the heating of the water with more electric heating elements 48 in the swing tank 34. The controller 51 is programmed, as shown in FIG. 4, such that when the outdoor temperature is below about 40 degrees Fahrenheit and above about 24 degrees Fahrenheit, a call for additional heat is answered by the activation of the first bank of heating elements 52 and the second bank of heating elements 54 to provide a greater share of the heating of the water required by the system. The third bank of heating elements 56 is not initially activated.

Figure 5:
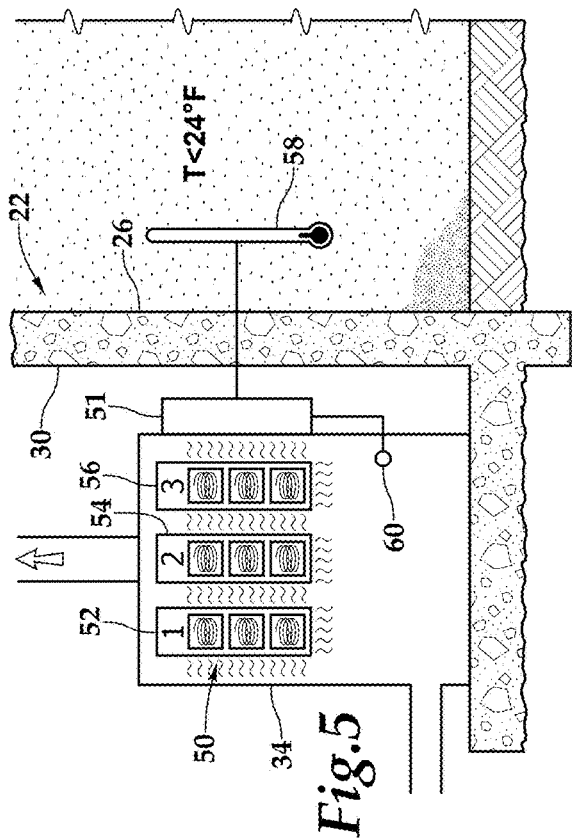
FIG. 5 is a schematic drawing of the water heater of FIG. 1 when ambient temperatures are coldest.

As shown in FIG. 5, it is known that when the outdoor temperature falls below about 24 degrees Fahrenheit, or about 8 degrees Fahrenheit below freezing, an even greater level of heating support is advantageously provided from the swing tank heating apparatus 50. Thus when the controller detects that the water within the swing tank is at a temperature below the desired set point from a reading of the internal thermometer 60 and that the outside ambient temperature is below about 24 degrees Fahrenheit, the controller activates the first bank of heating elements 52, the second bank of heating elements 54 and the third bank of heating elements 56.

It will be observed that the controller 51 is programmed to activate heating elements based on the understood relationship between heat pump water heater 24 performance and different ambient temperature levels. At different outdoor temperatures it is not necessary for the controller to wait to detect that fewer banks are not up to the demand, as the performance of the system is predetermined by the outside temperature. As a result, the system can expeditiously meet the hot water demand while drawing on the electricity available at no more than the needed levels of current. This is particularly advantageous in areas subject to blackouts and brownouts, and where electric power availability is restricted. In addition, in areas with these power supply limitations, the heating apparatus is provided with two deactivation switches, such as dip switches, not shown, which disable the third bank 56 or the second and third banks 54 and 56. With selected heating elements disabled, the time to bring the hot water up to the desired set point may be extended, but the electricity demand will be reduced to adhere to local requirements.

The swing tank 34 also serves as a backup to the heat pump water heaters 24 should they go off-line due to malfunction or required servicing. In such a circumstance, the operator manually intervenes to change the operating mode from a swing tank mode to a standard water heater mode in which all banks of heating elements operate simultaneously.

Figure 1A:
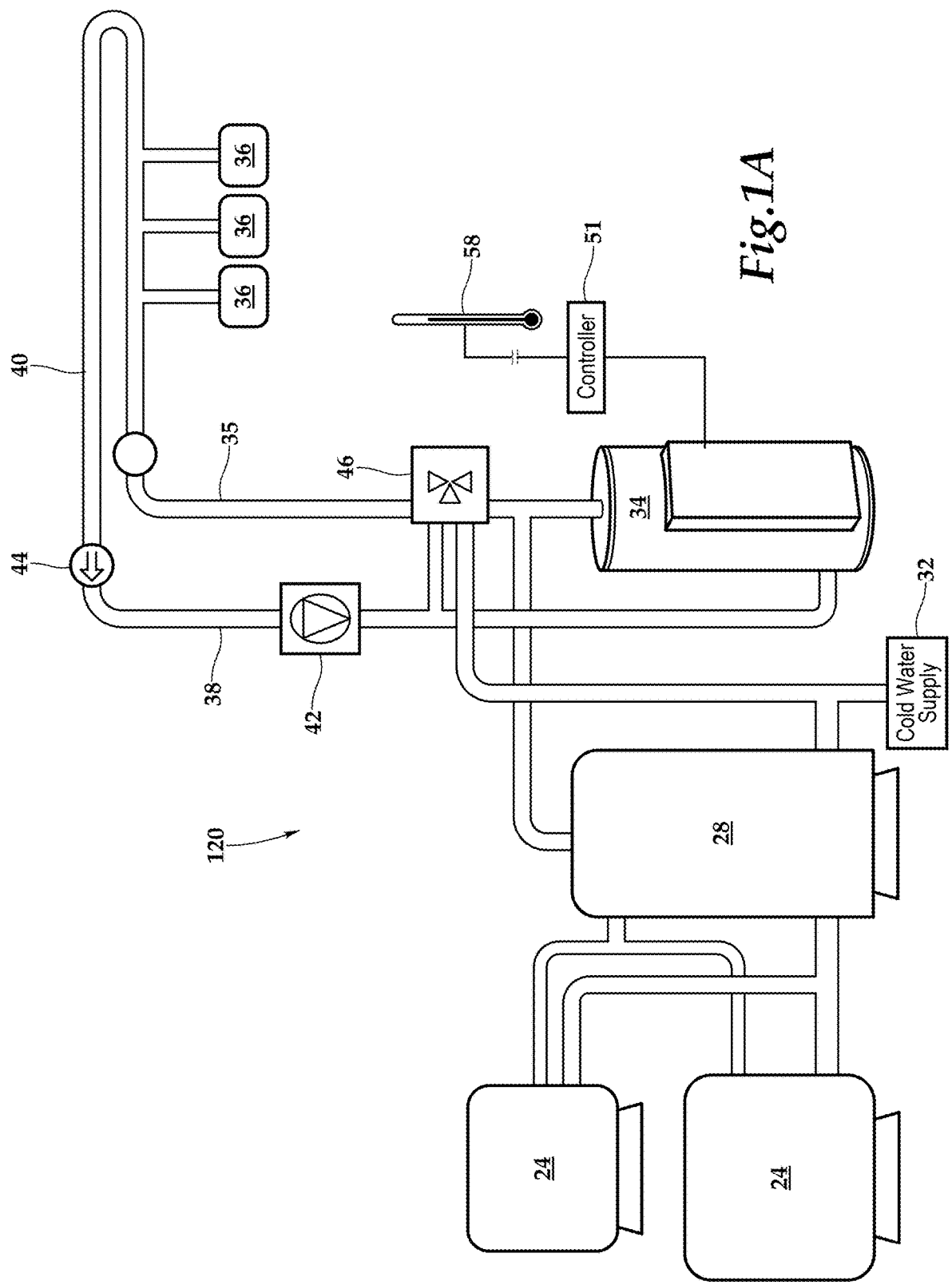
FIG. 1A is a schematic drawing of a water heater of this invention piped in a parallel swing configuration within a hot water system employing a heat pump.

In environments where it is not desired to flow water from the primary storage tank 28 through the swing tank 34, an alternative arrangement system 120 is shown in FIG. 1A.

The system 120 is identical to the system 20, except that the water from the primary hot water storage tank 28 bypasses the swing tank 34.

It should be noted that although the system has been illustrated and described in use with a single-pass heat pump water heater, it may also be used with a multi-pass heat pump water heater system in which heated water is recirculated from the storage tank to the heat pump water heater, with the temperature being raised with each pass.

The swing tank 34 may be positioned on the building interior. If it is desired to place the swing tank on the building exterior, the tank should be sealed to prevent any water ingress.

It is understood that the invention is not limited to the particular construction and arrangement of parts herein illustrated and described, but embraces all such modified forms thereof as come within the scope of the following claims.

I claim:

1. An apparatus for use with a heat pump water heater to supply hot water to a recirculation loop, the apparatus comprising:
   a swing tank having an interior for containing water, wherein the swing tank has piping to supply hot water to the recirculation loop together with heated water from the heat pump water heater;
   a controller;
   an outdoor temperature sensor positioned exterior to the swing tank for installation on an exterior of said building to measure ambient exterior temperatures, the controller being connected to the outdoor temperature sensor to detect a measured temperature; and
   a plurality of electric heating elements positioned on the interior of the swing tank for heating of water contained therein, the plurality of electric heating elements being arranged in a first heating sector, a second heating sector and a third heating sector, wherein the controller activates the plurality of electric heating elements within the first heating sector, the second heating sector and the third heating sector in response to the measured temperature received from the outdoor temperature sensor, such that when the measured temperature is greater than or equal to 40 degrees Fahrenheit, only the electric heating elements in the first heating sector are activated when heating of water within the swing tank is required, and when the measured temperature is less than 40 degrees Fahrenheit and greater than or equal to 24 degrees Fahrenheit, only the electric heating elements in the first heating sector and the second heating sector are activated, and when the measured temperature is less than 24 degrees Fahrenheit, all the electric heating elements are activated.

2. The apparatus of claim 1 wherein the swing tank is for installation on the interior of a building.

3. The apparatus of claim 1 wherein the swing tank is for installation exterior of the building.

* * * * *